Nov. 14, 1967 — M. R. JAYARAM — 3,352,985
TAMPER-PROOF FLAME SENSOR CONTROL
Filed May 18, 1966 — 2 Sheets-Sheet 1

INVENTOR.
M. R. JAYARAM
BY Alan M. Staubly
ATTORNEY

United States Patent Office 3,352,985
Patented Nov. 14, 1967

3,352,985
TAMPER-PROOF FLAME SENSOR CONTROL
M. R. Jayaram, Long Beach, Calif., assignor to Honeywell Inc., Minneapolis, Minn., a corporation of Delaware
Filed May 18, 1966, Ser. No. 551,064
6 Claims. (Cl. 200—137)

ABSTRACT OF THE DISCLOSURE

The tamper-proof flame sensor has a pair of fixed contacts facing each other and spaced a short distance apart. A flexible contact blade is fixed at one end and has a free end that extends between the fixed contacts and normally engages one of them. An insulation button is mounted on the blade intermediate its ends and is engaged by a rod of a slip friction mechanism. This mechanism, which consists of a floating lever carrying, intermediate its ends, spring loaded members or clutches engaging the rod. The lever is forked at one end to straddle and loosely hook around a reduced width portion of a wall and pivot against shoulders provided by a widened portion of the wall. A spring engages the lever between the wall and slip friction mechanism to bias the lever about the shoulders as a pivot to move the slip friction mechanism in a direction to permit the contact blade to assume its normal position. A rod and tube temperature sensor is positioned to engage the lever between the spring and the slip friction mechanism, to pivot the lever against the bias of the spring, to move the slip friction mechanism and contact arm. A manually operable reset actuator is positioned to engage and move the other end of the lever to properly position the slip friction clutches on an actuating pin for the contact arm. This arrangement makes it impossible for the lever to be improperly held by the manual actuator against movement to actuate the contacts, as the lever is free to move away from the shoulder pivots at the other end thereof by overcoming the bias of the above mentioned spring.

---

This invention relates to a quick-acting control device and, more particularly, to a mechanical flame sensor embodying a slip friction mechanism which causes the sensor to quickly respond to the presence or absence of a flame, to perform a control function. It is an improvement over the invention disclosed in Bixby et al. Patent No. 3,235,-691, in that it has an arrangement of the slip friction mechanism that prevents a person from being able to "fool" the device by blocking a manually reset mechanism in its operating position. The mechanism of the invention is also of such a nature that the flame sensing portion thereof is independent of the contact structure, to avoid misalignment and variable timing. Various novel features of the invention will become apparent upon studying the following detailed description of the invention, in conjunction with the accompanying drawing wherein:

Figure 1:
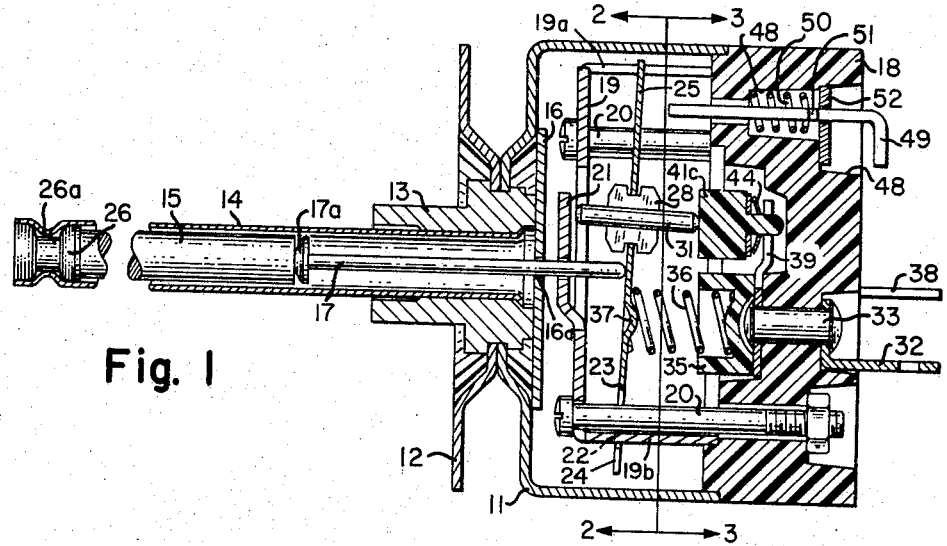
FIGURE 1 is a fragmentary cross-sectional view along the longitudinal axis of the invention.
Figure 2:
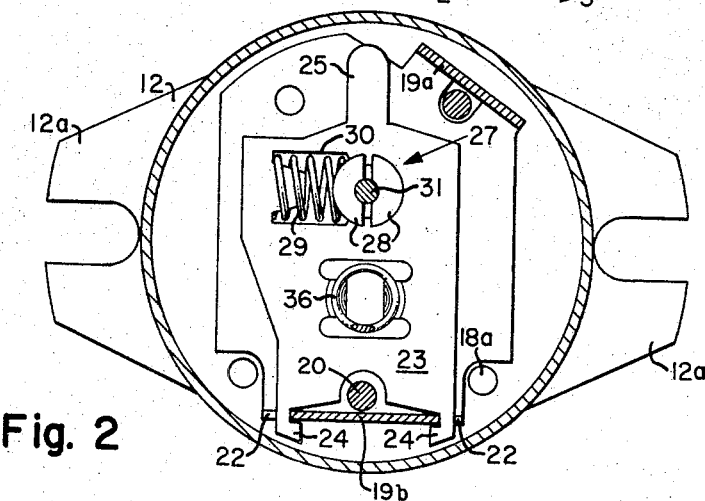
FIGURE 2 is a cross-sectional view thereof taken along line 2—2 of FIGURE 1.

Referring to FIGURE 1 of the drawing the control device or flame sensor includes a generally cup-shaped housing portion 11 secured to a mounting plate 12 by means of a cylindrical coupling 13. The coupling has a pair of mounting ears 12a through which bolts (not shown) may extend and through aligned openings in a burner supported bracket or furnace wall to rigidly secure the units to the furnace. Extending through the coupling 13, is a metallic tube 14 which serves as the expansion element of the flame sensor. The tube is closed at its outer end by means of an annularly grooved plug 26 into which the tube is rolled at 26a. The tube cooperates with a relatively non-expansible ceramic rod 15 positioned therein for actuating purposes. A washer 16, positioned in the housing portion 11 and over the inner end of the tube 14, has a small opening 16a therein through which a stem 17 extends. This stem has a head portion 17a that bears against the inner end of the rod 15.

A second housing portion or base 18, which is preferably made of Bakelite or a ceramic material, is positioned in the open end of the cup-shaped housing portion 11 and is secured thereto by means of bolts (not shown) that extend through holes 18a in the base 18 and through threaded openings (not shown) in the closed end of the housing portion 11. A bracket 19 is secured to the base 18 by means of bolts 20 and this bracket has a laterally struck arm 21 thereon with an opening therethrough in alignment with the rod 15 and stem 17 and the opening 16a in the washer 16, to hold the stem 17 in axial alignment with the rod 15. The bracket has a uniform width leg 19a at one end thereof and a similar leg with a reduced width portion 19b at its other end and a pair of abutment shoulders 22 against which a lever 23 is pivoted. The shoulders are provided by the wider portion of the leg adjoining the portion 19b.

The lever 23 has a pair of inwardly extending ears 24 at its pivoted end which holds the pivoted end of the lever against a reduced width portion 19a of the bracket 19 but permits sliding movement of the lever along the portion 19a away from the abutments 22, for a purpose to be described hereinafter. The other end of the lever 23 has a projection 25 that extends to the other side of the bracket for pivotal movement therein. A slip friction mechanism, generally designated by the reference numeral 27, is generally the same as that disclosed in the above-mentioned Patent No. 3,235,691 and consists of a pair of friction members or clutches 28 and a coil spring 29, positioned in a stepped opening 30 in the lever 23. Extending between the friction members 28, is a pin 31 that is arranged to engage the arm 21 at one of its ends and a switching mechanism at its other end.

A terminal member 32 is secured to the base 18 by means of a rivet 33 extending through the terminal member and the base and through a fixed contact arm member 34, providing an electrical connection between the terminal 32 and the fixed contact arm 34. A cup-shaped insulator 35 has a recess in the base thereof that fits over the head of the rivet 33 and has a socket portion that receives one end of a spring 36. The other end of the spring 36 fits around a projection 37 in the lever 23. It will be noted that this spring 36 resiliently biases the lever 23 against the abutments 22 and the inner end of the stem 17.

Figure 3:
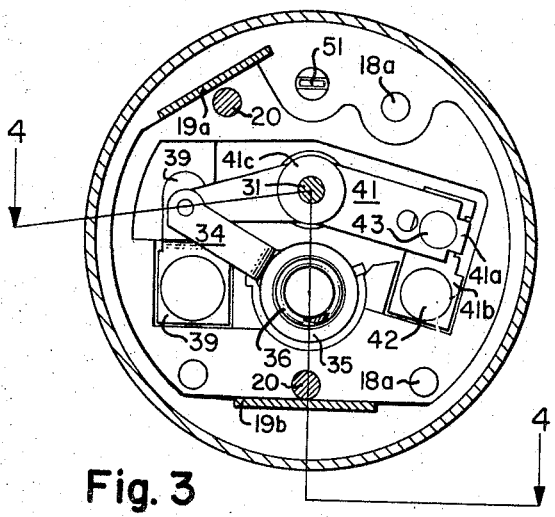
FIGURE 3 is a cross-sectional view of the invention taken along line 3—3 of FIGURE 1.
Figure 4:
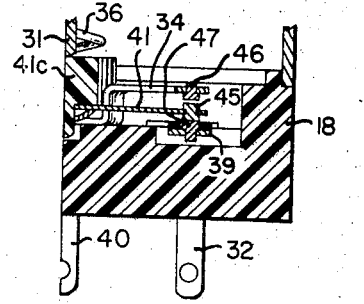
FIGURE 4 is a cross-sectional view taken along line 4—4 of FIGURE 3.
Figure 5:
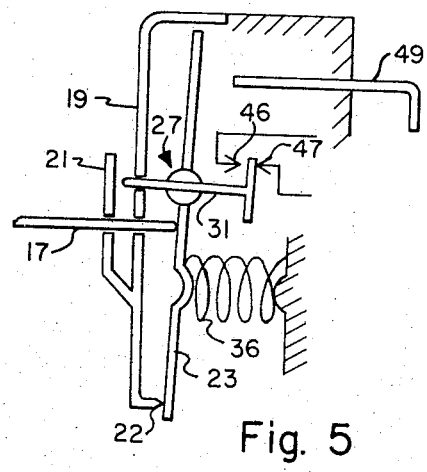
FIGURE 5 is a schematic showing of the elements of the invention in their normal positions.
Figure 7:
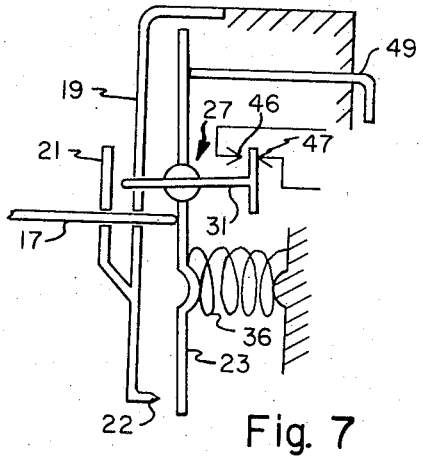
FIGURE 7 is a schematic showing of the elements with the manual actuator blocked in its operating position and with no flame heating the control device.
Figure 6:
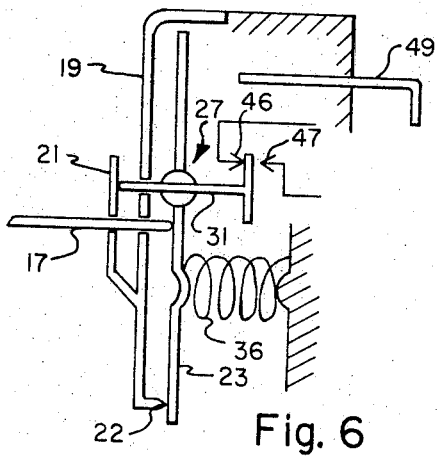
FIGURE 6 is a similar showing when the control device is responding to the presence of a flame.
Figure 8:
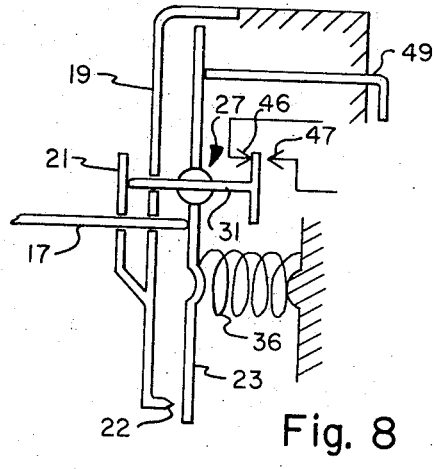
FIGURE 8 is a showing similar to FIGURE 7 when the control device is sensing a flame and with the manual actuator still blocked.

A second terminal member 38 is similarly connected to the base 18 and to a second fixed contact member 39 (see FIGURE 3). A third terminal member 40 is likewise secured by a rivet 42 to the base member 18 and to a relatively stiff fixed portion 41b of a two piece movable contact blade 41. The fixed end of a resilient portion of the contact arm 41 is anchored against rotational movement on the portion 41b by means of a transversing bent tab 41a and a rivet 43. Instead of a tab 41a, a pair of smaller rivets may be used to secure the flexible or movable portion 41 to its fixed end portion 41b, if so desired.

The intermediate portion of the flexible contact arm 41 carries an insulation button 41c that is contacted by the adjacent end of the pin 31 of the slip friction mechanism. The button is held on the arm 41 by means of a Tinnerman nut 44. The free end of the contact arm 41 has a contact portion 45 that is positioned between fixed contact buttons 46 and 47 on the contact arms 34 and 39, respectively. The friction between the pin 31 and members 28 is such that there is normally no slipping therebetween in overcoming the bias of arm 41 to move contact 45 against contact 47.

Extending through a stepped bore 48 in the base 18, is a manual reset actuator that has an inner end adapted to engage the projection 25 of the lever 23 to move it toward the stem 17. The actuator is biased outwardly by means of a coil spring 50 extending from a shoulder in the stepped bore to a pair of transversely extending shoulders 51 intermediate the ends of the actuator. A plate 52 is secured to the base by means of one of the bolts that holds the bracket 19 in assembled relationship with the base 18. The spring normally holds the actuator 49 in a position that permits free movement of the end 25 of lever 23 in response to movement of the flame sensing mechanism. During shipment or other jarring of the control device, the pin 31 sometimes gets "out of step," that is, the pin slips through the members 28 and comes in contact with the abutment 21, placing contact 45 in engagement with contact 46 rather than contact 47, in the cold or unheated condition of the rod and tube. By shoving the actuator 49 against the lever and sliding the members 28 along the pin 31, return movement of the actuator 49 will cause the blade to move from contact 46 to contact 45, where it should be.

The control device of the flame sensor is illustrated as being in its normal condition, that is, in a no flame sensing condition wherein the contact arm 41 is held in its flexed condition with contact button 45 in engagement with contact button 47. In this condition, with the contact button and its associated terminal 32 connected to an igniter and the movable contact arm 41 connected in a circuit for completing a circuit to the igniter, in a conventional manner, upon a call for heat by the system in which it is installed, the igniter is energized to ignite fuel being supplied by other control apparatus, which has also been energized. Upon a flame occurring in the furnace so that the tube 14 is heated, the stem 17 will move to the left, following the movement of the rod 15 under the bias of spring 36, to cause the slip friction mechanism to move to the left as viewed in FIGURE 1. The initial movement of the slip friction mechanism will permit the contact arm 41, through its inherent resilience, to follow the movement of the slip friction mechanism and cause contact 45 to separate from contact 47. Immediately following the separation of contacts 45 and 47, contact 45 will engage contact 46 (which may be connected in a circuit to provide an additional control function in the heating system) followed by engagement of arm 21 by pin 31. It is thus seen that the flame sensor quickly terminates the operation of the igniting circuit once the flame is present and quickly operates to perform an additional function in the circuit, provided there is a need for this control function that is provided by the contact 46. Obviously the flame sensor could be made with only contacts 45 and 47. Any additional movement of the lever counterclockwise will cause the members 28 to slide on the pin 31 until the tube 14 ceases to expand.

Upon a flame failure, the tube 14 will contract and cause the rod, stem and slip friction mechanism to immediately move the contact arm 41 to again complete the circuit through the igniter to again ignite the burner. Following the making of contacts 45 and 47, the right-hand end of the button 41c, as viewed in FIGURE 1, engages the base 18 and any further clockwise movement of lever 23 will cause the members 28 to slide on the pin 31 until the tube ceases to contract. Should an attempt be made to prevent this type of movement by holding or blocking the actuator 49 in its reset position, with the inner end of the actuator 49 holding the lever 23 against movement in a direction to cause closing of the contacts 45 and 47, the spring 36 can yield to permit the lower end of the lever 23 to slide along bracket portion 19b and to move away from the abutments 22, pivoting about the end of reset actuator 49, to cause the closing of these contacts. It is thus seen that the device is foolproof with respect to an improper attempt to block the apparatus in a position that would prevent reignition or would hold the contacts 45 and 46 closed.

As modifications may be made in the invention without departing from the spirit thereof, the scope of the invention should be determined from the appended claims.

I claim as my invention:

1. A control device comprising a support, control means on said support and having a fixed member and a second member movable into and out of engagement with said fixed member, condition responsive means mounted on said support and having first actuator means spaced from said second member, a lever positioned between said first actuator means for movement thereby and said second member for movement thereof, one end of said lever being pivoted on abutment means on said support but being movable away from said abutment means, slip friction means between said lever and said second member, resilient means engaging said lever for yieldably holding said lever against said abutment and in operating contact with said first actuator means, motion transmitting means between said lever and said second member to provide immediate movements of said second member upon changes in direction of movement of said first actuator means, and second actuator means arranged to move said lever toward said first actuator means and so positioned that if said second actuator means is held in its lever first actuator position, said actuating means is positioned to move said lever away from said abutment means against the force of said resilient means to actuate said second member.

2. A control device as defined in claim 1 wherein said second actuator means serves as a pivot for said lever when said actuator means moves said lever away from said abutment.

3. A control device as defined in claim 1 wherein said motion transmitting means is operably connected to said lever on the opposite side of said first actuator means from where said resilient means engages said lever.

4. In combination with a device as defined in claim 1 a fixed third member positioned on said support for selective engagement by said second member.

5. The combination defined in claim 4 wherein said resilient means engages said lever at a position between said abutment means and said first actuator means.

6. A control device as defined in claim 1 wherein said fixed member and said second member are electric contacts.

References Cited

UNITED STATES PATENTS 3,235,691   2/1966   Bixby et al. _____ 200—137

BERNARD A. GILHEANY, *Primary Examiner.*

H. A. LEWITTER, *Assistant Examiner.*